Sept. 7, 1965 J. MLADJAN 3,204,584
MICROPOSITIONER
Filed Nov. 26, 1963
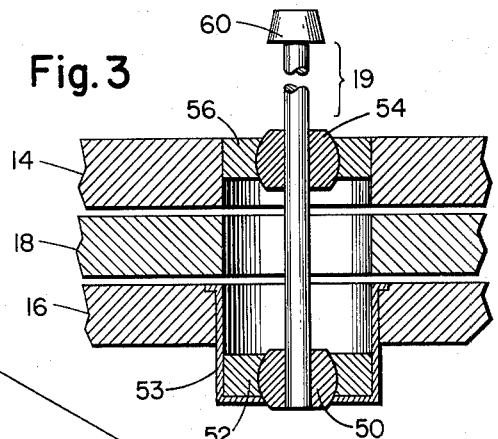
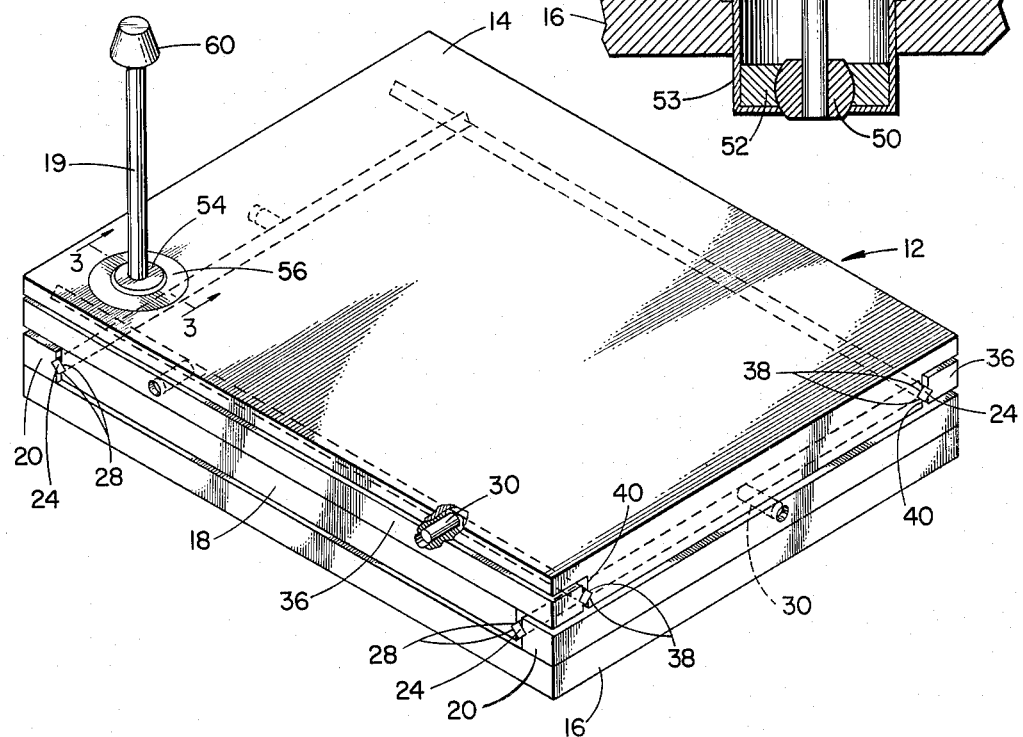
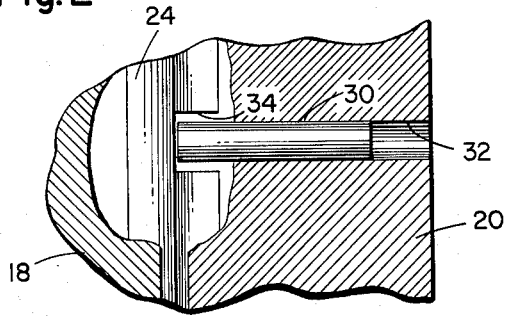
INVENTOR.
JOHN MLADJAN
BY Edward O. Ansell
William E. Hiller
ATTORNEYS

United States Patent Office 3,204,584
Patented Sept. 7, 1965

3,204,584
MICROPOSITIONER
John Mladjan, Glendora, Calif., assignor to Aerojet-General Corporation, Azusa, Calif., a corporation of Ohio
Filed Nov. 26, 1963, Ser. No. 325,985
15 Claims. (Cl. 108—143)

This invention generally relates to a platform supported for planar movement by a bearing assembly, and more particularly to a micropositioner assembly including a novel bearing assembly for supporting a platform for extremely precise, substantially planar movement of the platform in which the individual bearings comprise elongate strips of plastic material.

Where extremely sensitive members must be supported in such a way as to provide for precise movement thereof, the use of precision bearings and precision guideways is indicated as a means of supporting such members.

Generally, it is necessary to employ special metals, such as heat-treated stainless steel, in making precision bearings for imparting long wearing and non-corrosive characteristics to the precision bearings. The use of special metals has the disadvantages of high costs for the raw material and the treatment thereof in manufacturing parts of the precision bearing. In addition, lubrication may be needed to decrease frictional wear and to provide for smooth operation of a precision bearing. Lubricants are subject to decomposition and may collect foreign matter, such as dust particles, which may be abrasive in nature to cause increased wear of the precision bearing with which they are used. The use of lubricants may also require lubricating lines and ducting in order to insure that the precision bearing is adequately supplied with lubricant.

In some applications, such as where two dimensional movement of one member is required with respect to another member, a bearing assembly including several bearings may be required to provide for the necessary support of the movable member. The use of a bearing assembly including several bearings introduces problems of alinement as between the individual bearings, bearing retainers, and other component parts of the bearing assembly.

It is therefore an object of this invention to provide a bearing assembly of simple construction for supporting a platform for precise substantially planar movement of the platform, wherein specially treated metals are not required for parts of the bearing assembly even though precise support of the movable platform by the bearing assembly is demanded.

It is another object of this invention to provide a novel bearing assembly for precisely supporting a platform for substantially planar movement in which the individual bearings comprise elongate strips of plastic material having a low coefficent of friction so as to be essentially self-lubricating for obviating the necessity for the use of lubricants in the bearing assembly.

It is another object of this invention to provide an improved micropositioner assembly in which a platform is supported for extremely precise planar movement by a bearing assembly comprising individual bearings of elongated plastic strips, wherein a manually operable lever is connected into the bearing assembly and the platform for effecting precise planar movement of the platform in any desired direction upon manipulation thereof.

In accomplishing these and other objects, the present invention contemplates a micropositioner assembly involving a platform supported by a novel bearing assembly in which the individual bearings comprise elongate strips of a suitable self-lubricating plastic material, the elongate strips being disposed in grooves formed between a pair of relatively movable members to support precise substantially planar movement of the platform controlled by manipulation of a lever. A preferred plastic material for the bearing strips in accordance with the present invention is a polytetrafluoroethylene plastic known by the trademark "Teflon" and manufactured by E. I. du Pont de Nemours and Company of Wilmington, Delaware. In addition to providing better distribution of the load imposed on a bearing assembly by a member supported thereby for planar movement by spreading the load over the entire lengths of the "Teflon" bearing strips instead of over individual precision bearings, the "Teflon" bearing strips are self-lubricating and are unaffected by almost all known chemicals.

For a more complete understanding of this invention, reference is made to the following detailed description and to the accompanying drawings, in which:

FIGURE 1 is an isometric view, partly in section, of a micropositioner assembly including a platform supported for planar movement by a bearing assembly, as constructed in accordance with the present invention;

FIGURE 2 is an enlarged transverse sectional view, showing a locking pin for one of the bearing strips in the bearing assembly of the micropositioner assembly of FIGURE 1; and FIGURE 3 is a sectional view taken along the line 3—3 in FIGURE 1.

Referring more specifically to the drawings, FIGURE 1 illustrates a micropositioner assembly 12 such as would be suitable in a microwelder apparatus of the type disclosed in copending U.S. patent application, Serial No. 214,051 filed August 1, 1962, for example, or as a specimen support for a microscope, or the like. The micropositioner assembly 12 comprises an upper platform 14, a lower base or stand 16, an intermediate plate member 18 sandwiched between the platform 14 and the base 16, and an operating lever 19 for effecting precise planar movement of the platform 14, the lever 19 being connected into the base 16, the intermediate plate member 18, and the platform 14 in a manner to be hereinafter described. The intermediate plate member 18 is mounted on the base 16 for planar reciprocatory movement with respect thereto in one direction, while the platform 14 is slidably mounted on the intermediate plate member 18 for planar reciprocation with respect therewith in a second direction normal to the direction of movement of the intermediate plate member 18 with respect to the base 16. The platform 14 is therefore capable of universal motion relative to the base 16 in a plane parallel therewith by virtue of a bearing assembly to be hereinafter described, the bearing assembly supporting the plate member 18 and the platform 14 on the base 16 for planar movement with respect thereto.

In this connection, the base 16 is provided with a pair of guide members 20 suitably secured to its top surface on the oppositely disposed sides thereof, as by bolting or welding. Each of the guide members 20 includes an elongate substantially V-shaped notch along its length, the notch opening inwardly toward the adjacent side edge surface of the plate member 18 which is similarly provided with a substantially V-shaped notch along its length.

An elongated bearing strip 24 is seated in each of the V-shaped notches provided in the guide members 20 and is slidably received by runways 28 which define the opposite side walls of the V-shaped notches in each of the side surfaces of the plate member 18. The elongated bearing strips 24 are made from a suitable self-lubricating plastic material, "Teflon" being a preferred material because of its excellent wear characteristics and low coefficient of friction. The bearing strips 24 are retained against movement in the V-shaped notches of the guide members 20 on the base 16 by suitable securing means. In the illustrated embodiment, the means securing the bearing strips 24 to the guide members 20 comprises locking pins 30 which are respectively frictionally fixed in bores 32 transversely located in the guide members 20 with respect to the bearing strips 24, the locking pins 30 extending inwardly of the guide members 20 into circular slots 34 formed in the bearing strips 24.

The intermediate plate member 18 is also provided with a pair of guide members 36 secured to its top surface on the oppositely disposed ends thereof by suitable means, such as bolting or welding. The guide members 36 on the plate member 18 are disposed at right angles to the guide members 20 on the base 16 and are provided with inwardly opening, substantially V-shaped elongate notches along their lengths. The end edges of the platform 14 are recessed to provide inner end edge surfaces 40 respectively disposed inwardly of and adjacent to the guide members 36. The recessed end edge surfaces 40 of the platform 14 are provided with substantially V-shaped notches along their lengths which are disposed in opposed outwardly opening relation to the V-shaped notches in the guide members 36.

Elongated bearing strips 24, preferably of "Teflon" plastic, are seated in the V-shaped notches provided in the guide members 36, being retained therein against movement by locking pins 30 fixedly carried in bores 32 in the guide members 36 and extending inwardly into circular slots 34 formed in the bearing strips 24 as previously described. The bearing strips 24 carried by the guide members 36 are slidably received by runways 38 which define the opposite side walls of the V-shaped notches in the recessed end edge surfaces 40 of the platform 14.

Means are provided to effect precise planar movement of the platform 14 in a desired direction with respect to the base 16, such means preferably taking the form of the manually operable lever 19. Referring to FIGURE 3, it will be seen that the lever 19 is provided with a spherical member or ball 50 fixed on one end thereof which is swively received in a spherical socket formed in a first or lower bearing member 52. The lower bearing member 52 is frictionally seated in a cup-shaped upwardly opening housing 53 which is pressed into a suitable opening extending through the base 16 at one corner thereof. The lever 19 extends upwardly through openings in the plate member 18 and the platform 14, the openings in the plate member 18 and the platform 14 being vertically alined with the opening in the base 16 receiving the cup-shaped housing 53. An intermediate spherical member or ball 54 is rigidly affixed to the lever 19 and is swively received by a complementary spherical socket formed in a second or upper bearing member 56 which is frictionally pressed into the opening in the platform 14. The lever 19 extends above the platform 14, and its upper end is provided with an operating knob 60 to facilitate manipulation thereof. It will be understood that the lever 19 may be manually operated by grasping the knob 60 and appropriately moving the lever 19 about the ball 50 at its lower end in engagement with the lower bearing member 52 having the spherical socket which receives the ball 50.

Thus, the platform 14 may be relatively moved with respect to the base 16 in a plane to assume a precise position as desired, the platform 14 and the plate member 18 being supported for movement on the base 16 by elongated bearings in the form of the strips 24.

The preferred "Teflon" bearing strips 24 are resilient and possess a good plastic "memory" which permits ordinary workmanship in machining the runways which slide along the bearing strips 24 to be satisfactory, rather than the highly accurate machining normally required for a precision bearing. The self-lubricating quality of "Teflon" further permits the use of less-expensive materials to form the runways, such as aluminum, for example, in place of the costly special metals, such as stainless steel, heretofore commonly used in precision bearing assemblies.

While the bearing strips 24 have been shown and described as being continuous elongated strips of square or substantially diamond-shaped cross section, it is to be understood that the bearing strips 24 may have cross sections of circular form or other suitable form and may comprise a series of segments rather than single continuous strips. These and other modifications are merely illustrative of various embodiments of my invention which is intended to be limited only by the following claims.

I claim:
1. In combination,
  (a) a base,
  (b) a plate member superimposed on said base,
  (c) means mounting said plate member on said base for planar movement of said plate member in one direction with respect to said base,
  (d) a platform superimposed on said plate member,
  (e) means mounting said platform on said plate member for planar movement of said platform with respect to said plate member in a direction normal to the direction of movement of said plate member with respect to said base, and
  (f) lever means extending through said platform and said plate member and having a lower end seated in said base for universal movement with respect thereto, said lever means being operable to effect planar movement of said platform with respect to said base in any desired direction upon manipulation thereof.

2. In combination,
  (a) a pair of superimposed members,
  (b) one of said members having elongated guide members thereon extending along oppositely disposed sides thereof,
  (c) the other of said members having edge surfaces thereon disposed inwardly of and in opposing relation to respective surfaces on said guide members,
  (d) bearing strips carried by said guide members on the surfaces thereof opposed to said edge surfaces of the other of said members,
  (e) said bearing strips being disposed in parallel relation, and
  (f) runways on the said edge surfaces of the other of said members slidably engaging said bearing strips, whereby said members are relatively movable to each other in a plane which includes said bearing strips.

3. The structure set forth in claim 2, further including
  (g) a transverse pin fixedly secured to each of said guide members and extending inwardly thereof,
  (h) each of said bearing strips being provided with a recess opening outwardly toward its respective guide member, and
  (i) said pins being received in the recesses in said bearing strips to retain said bearing strips with said guide members.

4. The structure set forth in claim 2, wherein
  (g) each of said bearing strips comprises polytetrafluoroethylene material.

5. In combination,
  (a) a pair of superimposed members,
  (b) one of said members having elongated guide members theron extending along oppositely disposed sides thereof,
  (c) the other of said members having surfaces thereon disposed in opposing relation to respective surfaces on said guide members,
  (d) each of the said surfaces on the other of said members and on said guide members being provided with elongated notches therein to define sets of complementary elongated notches,
(e) an elongated bearing strip received within each of said sets of complementary elongated notches,
(f) said bearing strips being in parallel relation,
(g) each of said bearing strips being seated within one of the notches comprising said set of complementary notches, and
(h) the walls defining the other notch of said set providing a runway slidably engageable with said bearing strip, whereby said members are relatively movable to each other in a plane which includes said bearing strips.

6. The structure set forth in claim 5, wherein
(i) each of said bearing strips comprises polytetrafluoroethylene material.

7. In combination,
(a) a pair of superimposed members,
(b) one of said members having elongated guide members thereon extending along oppositely disposed sides thereof and lying outwardly of at least a portion of the respective edge surfaces of the other of said members in overlapping relation thereto,
(c) the said edge surfaces of the other of said members being disposed in spaced opposing relation to respective surfaces on said guide members,
(d) each of the said surfaces on the other of said members and on said guide members being provided with elongated substantially V-shaped notches therein to define sets of complementary elongated notches,
(e) an elongated bearing strip having a substantially diamond-shaped cross section received within each of said sets of complementary elongated notches,
(f) said bearing strips being in parallel relation,
(g) each of said bearing strips being seated within the respective one of the notches comprising said set of complementary notches provided in the said surfaces on said guide members, and
(h) the walls defining the other notch of said set in said edge surface of the other of said members providing a runway slidably engageable with said bearing strip, whereby said members are relatively movable to each other in a plane which includes said bearing strips.

8. The structure set forth in claim 7, wherein
(i) each of said bearing strips comprises polytetrafluoroethylene material.

9. In combination,
(a) a base,
(b) a plate member superimposed on said base,
(c) a first pair of elongated guide members on oppositely disposed sides of said base overlying the opposite side edge surfaces of said plate member,
(d) a platform superimposed on said plate member,
(e) said platform having downwardly disposed recesses formed in its opposite end edges to define inner recessed end surfaces thereon,
(f) a second pair of elongated guide members on oppositely disposed ends of said plate member respectively overlying the inner recessed end surfaces of said platform and disposed at right angles to said first pair of guide members on said base,
(g) elongated bearing strips carried by each of said guide members in coextensive relationship therewith and protruding inwardly thereof, and
(h) runways on said side edge surfaces of said plate member and said inner recessed end surfaces of said platform in engagement with respective bearing strips corresponding thereto and slidable therealong, whereby said plate member is relatively movable to said base in a first planar direction and said platform is relatively movable to said plate member in a second planar direction normal to the first planar direction.

10. In combination,
(a) a base,
(b) a plate member superimposed on said base,
(c) a first pair of elongated guide members on oppositely disposed sides of said base overlying the opposite side edge surfaces of said plate member,
(d) a platform superimposed on said plate member,
(e) a second pair of elongated guide members on oppositely disposed ends of said plate member respectively overlying at least a portion of the end edge surfaces of said platform and disposed at right angles to said first pair of guide members on said base,
(f) elongated bearing strips carried by each of said guide members in coextensive relationship therewith and protruding inwardly thereof,
(g) runways on said side edge surfaces of said plate member and said end surfaces of said platform in engagement with respective bearing strips corresponding thereto and slidable therealong, and
(h) means operably connected to said base, said plate member, and said platform for moving said plate member relative to said base in a first planar direction with said platform being carried with said plate member and for moving said platform relative to said plate member and said base in a second planar direction normal to the first planar direction.

11. The structure set forth in claim 10, wherein
(i) each of said bearing strips comprises polytetrafluoroethylene material.

12. In combination,
(a) a base,
(b) a plate member superimposed on said base,
(c) means mounting said plate member on said base for planar movement of said plate member in one direction with respect to said base,
(d) a platform superimposed on said plate member,
(e) means mounting said platform on said plate member for planar movement of said platform with respect to said plate member in a direction normal to the direction of movement of said plate member with respect to said base,
(f) said base, said plate member, and said platform being respectively provided with openings therethrough arranged in vertical alinement,
(g) a lever freely and loosely received in said openings and extending therethrough, the upper end of said lever being disposed above said platform,
(h) means defining a spherical socket in each of said base and said platform respectively associated with said openings in said base and said platform,
(i) a first spherical member fixed on the lower end of said lever and swivelly received in the spherical socket provided in said base, and
(j) a second spherical member fixed on said lever intermediate its ends and swivelly received in the spherical socket provided in said platform, whereby the upper end of said lever can be manipulated to effect planar movement of said platform with respect to said base in any desired direction.

13. In combination,
(a) a base,
(b) a plate member superimposed on said base,
(c) a first pair of elongated guide members on oppositely disposed sides of said base overlying the opposite side edge surfaces of said plate member,
(d) a platform superimposed on said plate member,
(e) said platform having downwardly disposed recesses formed in its opposite end edges to define inner recessed end surfaces thereon,
(f) a second pair of elongated guide members on oppositely disposed ends of said plate member respectively overlying the inner recessed end surfaces of said platform and disposed at right angles to said first pair of guide members on said base,
(g) elongated bearing strips carried by each of said guide members in coextensive relationship therewith and protruding inwardly thereof, (h) runways on said side edge surfaces of said plate member and said inner recessed end surfaces of said platform in engagement with respective bearing strips corresponding thereto and slidable therealong, whereby said plate member is relatively movable to said base in a first planar direction and said platform is relatively movable to said plate member in a second planar direction normal to the first planar direction, and (i) lever means extending through said platform and said plate member and having a lower end seated in said base for universal movement with respect thereto, said lever means being operable to effect planar movement of said platform with respect to said base in any desired direction upon manipulation thereof.

14. In combination,
(a) a base,
(b) a plate member superimposed on said base,
(c) a first pair of elongated guide members on oppositely disposed sides of said base overlying the opposite side edge surfaces of said plate member,
(d) a platform superimposed on said plate member,
(e) said platform having downwardly disposed recesses formed in its opposite end edges to define inner recessed end surfaces thereon,
(f) a second pair of elongated guide members on oppositely disposed ends of said plate member respectively overlying the inner recessed end surfaces of said platform and disposed at right angles to said first pair of guide members on said base,
(g) elongated bearing strips carried by each of said guide members in coextensive relationship therewith and protruding inwardly thereof,
(h) runways on said side edge surfaces of said plate member and said inner recessed end surfaces of said platform in engagement with respective bearing strips corresponding thereto and slidable therealong, whereby said plate member is relatively movable to said base in a first planar direction and said platform is relatively movable to said plate member in a second planar direction normal to the first planar direction,
(i) said base, said plate member, and said platform being respectively provided with openings therethrough arranged in vertical alinement,
(j) a lever freely and loosely extending through said openings, the upper end of said lever being disposed above said platform,
(k) means defining a spherical socket in each of said base and said platform respectively associated with said openings in said base and said platform,
(l) a first spherical member fixed on the lower end of said lever and swivelly received in the spherical socket provided in said base, and
(m) a second spherical member fixed on said lever intermediate its ends and swivelly received in the spherical socket provided in said platform, whereby the upper end of said lever can be manipulated to effect planar movement of said platform with respect to said base in any desired direction.

15. In combination,
(a) a base,
(b) a plate member superimposed on said base,
(c) a first pair of elongated guide members on oppositely disposed sides of said base overlying the opposite side edge surfaces of said plate member,
(d) a platform superimposed on said plate member,
(e) a second pair of elongated guide members on oppositely disposed ends of said plate member respectively overlying at least a portion of the end edge surfaces of said platform and disposed at right angles to said first pair of guide members on said base,
(f) elongated bearing strips carried by each of said guide members in coextensive relationship therewith and protruding inwardly thereof,
(g) runways on said side edge surfaces of said plate member and said end surfaces of said platform in engagement with respective bearing strips corresponding thereto and slidable therealong, whereby said plate member is relatively movable to said base in a first planar direction and said platform is relatively movable to said plate member in a second planar direction normal to the first planar direction,
(h) said base, said plate member, and said platform being respectively provided with openings therethrough arranged in vertical alinement,
(i) a lever freely and loosely extending through said openings, the upper end of said lever being disposed above said platform,
(j) means defining a spherical socket in each of said base and said platform respectively associated with said openings in said base and said platform,
(k) a first spherical member fixed on the lower end of said lever and swivelly received in the spherical socket provided in said base, and
(l) a second spherical member fixed on said lever intermediate its ends and swivelly received in the spherical socket provided in said platform, whereby the upper end of said lever can be manipulated to effect planar movement of said platform with respect to said base in any desired direction.

References Cited by the Examiner
UNITED STATES PATENTS

| 1,285,628 | 11/18 | Craley | 248—23 X |
| 2,837,390 | 6/58 | Hellen | 108—137 |
| 2,982,285 | 5/61 | Edwards | 108—143 X |
| 3,116,568 | 1/64 | Morrison | 248—441 |

FRANK B. SHERRY, Primary Examiner.